US011396440B2

(12) United States Patent
Studer et al.

(10) Patent No.: US 11,396,440 B2
(45) Date of Patent: Jul. 26, 2022

(54) METHOD FOR DETERMINING INFORMATION RELATING TO ELEVATOR COMPONENTS RECEIVED IN AN ELEVATOR SHAFT

(71) Applicant: Inventio AG, Hergiswil (CH)

(72) Inventors: Christian Studer, Kriens (CH); Philipp Zimmerli, Harkingen (CH)

(73) Assignee: INVENTIO AG, Hergiswil NW (CH)

( * ) Notice: Subject to any disclaimer, the term of this patent is extended or adjusted under 35 U.S.C. 154(b) by 1101 days.

(21) Appl. No.: 15/776,183

(22) PCT Filed: Nov. 18, 2016

(86) PCT No.: PCT/EP2016/078094
§ 371 (c)(1),
(2) Date: May 15, 2018

(87) PCT Pub. No.: WO2017/085238
PCT Pub. Date: May 26, 2017

(65) Prior Publication Data
US 2020/0283263 A1    Sep. 10, 2020

(30) Foreign Application Priority Data
Nov. 19, 2015   (EP) .................................. 15195409

(51) Int. Cl.
*B66B 5/00* (2006.01)
*B66B 1/34* (2006.01)
*G06K 7/14* (2006.01)
(52) U.S. Cl.
CPC .......... *B66B 5/0018* (2013.01); *B66B 1/3492* (2013.01); *B66B 5/0037* (2013.01); *G06K 7/1417* (2013.01)

(58) Field of Classification Search
CPC ... B66B 19/007; B66B 5/0087; B66B 5/0018; B66B 1/3492; B66B 5/0037; B66B 19/00; B66B 5/00; G06K 7/1417
See application file for complete search history.

(56) References Cited

U.S. PATENT DOCUMENTS

2012/0306666 A1   12/2012  Xu et al.
2014/0020175 A1    1/2014  Dixon et al.
(Continued)

FOREIGN PATENT DOCUMENTS

CN    204251103 U     4/2015
JP    H06278964 A    10/1994
(Continued)

*Primary Examiner* — Jeffrey Donels
(74) *Attorney, Agent, or Firm* — William J. Clemens; Shumaker, Loop & Kendrick, LLP

(57) ABSTRACT

A method determines information relating to elevator components received in an elevator shaft, the elevator components each being provided with a machine-readable marker on which component-specific information is stored, which information is read out by a marker reading device. In the method, a movable elevator element on which the marker reading device is arranged is moved through the elevator shaft and the component-specific information is read out from the markers. The markers can be, for example, markers that can be read out electromagnetically and in a contactless manner, such as RFID tags. The method also includes a comparison of the read-out component-specific information with nominal specifications, and the compiling of a report indicating instances of conformity and/or differences between the read-out component-specific information and the nominal specifications.

15 Claims, 2 Drawing Sheets

(56) References Cited

U.S. PATENT DOCUMENTS

| | | | | |
|---|---|---|---|---|
| 2015/0154324 A1* | 6/2015 | Reilio | ............... | B66B 5/0087 |
| | | | | 703/1 |
| 2015/0158699 A1* | 6/2015 | Haapaniemi | ......... | B66B 5/0087 |
| | | | | 702/155 |
| 2017/0197805 A1* | 7/2017 | Keiser | ............... | B66B 5/0087 |
| 2018/0086597 A1* | 3/2018 | Song | ................. | G05B 15/02 |
| 2020/0048037 A1* | 2/2020 | Toutaoui | ............ | B66B 5/0025 |
| 2021/0122609 A1* | 4/2021 | Meierhans | ........... | B66B 5/0025 |

FOREIGN PATENT DOCUMENTS

| | | | |
|---|---|---|---|
| JP | 3202396 | B2 | 8/2001 |
| JP | 2009062145 | A | 3/2009 |
| JP | 2009161310 | A | 7/2009 |
| JP | 2011148570 | A | 8/2011 |
| WO | 2004069714 | A1 | 8/2004 |
| WO | 2014027142 | A1 | 2/2014 |

\* cited by examiner

METHOD FOR DETERMINING INFORMATION RELATING TO ELEVATOR COMPONENTS RECEIVED IN AN ELEVATOR SHAFT

FIELD

The present invention relates to a method for determining and optionally logging information relating to elevator components received in an elevator shaft of an elevator system.

BACKGROUND

Elevators are generally used to transport passengers or objects within a building usually in a vertical direction. For this purpose, an elevator shaft is provided in the building or on the outside of the building, inside of which elevator shaft movable elevator elements, such as one or more elevator cars, a counterweight or the like, can be moved. The movable elevator elements are usually moved using suspension means, such as cables or belts, that are in turn moved by a drive sheave driven by a motor. Elevators that are operated hydraulically also exist.

In addition to the movable elevator elements mentioned, a plurality of other elevator components is usually arranged in the elevator shaft. For example, guide rails are usually securely fastened in the elevator shaft, along which rails the displaceable elevator elements can be moved in a guided manner. A buffer is usually provided on the floor of the elevator shaft in order to prevent a hard impact of the elevator car on the floor in the case of a functional error or a defect in the elevator system. A drive unit is usually provided near a roof of the elevator shaft in the case of many types of elevator, which drive unit drives the suspension means, for example, and thereby moves the movable elevator elements fastened to said suspension means within the elevator shaft. Automatically moving doors are typically provided in the elevator shaft at different floors of the building, which doors can allow access to the elevator car stopped on a specific floor or can block access to the elevator car as soon as the elevator car moves away from this floor. Furthermore, various other elevator components can be received in the elevator shaft, such as additional elevator components that are relevant to safety in the form of sensors, switches, detectors, emergency brake devices, evacuation devices etc.

When an elevator system is initially manufactured and optionally also when the elevator system is serviced at a later date, it is conventional practice of many manufacturers or operators to perform an inspection or final acceptance test of the elevator components received in the elevator shaft. An inspection of this kind usually at least involves noting the serial numbers and types of the received elevator components. In the case of elevator components that are relevant to safety, a certificate number is typically also included.

The inspection or logging process has hitherto usually been carried out manually by a person, such as an inspector, the person having to inspect all the elevator components incorporated in the elevator shaft, compare said components with nominal specifications and create a corresponding report. This can require a considerable amount of work.

JP 2009 062145 A discloses a method in which operating states of elevator components in an elevator shaft can be read out in an automated manner.

JP 2011 148570 A discloses a method for creating a report relating to servicing an elevator, in which method barcodes are used.

JP 2009161310 A discloses a device for servicing an elevator, which device can analyze RFID tags.

CN 204 251 103 U discloses a method for determining a position of a lifting cage of a construction elevator in an elevator shaft. In order to determine the position, the signal strength of an RFID UHF signal is evaluated.

WO 2004/069714 A1 discloses a method for determining a position of an elevator car of an elevator on the basis of ultrasound or electromagnetic waves.

Therefore, a method may be required in which information relating to elevator components received in an elevator can be collected easily, rapidly and/or using minimal effort and simultaneously with a high level of safety, and can be compared with nominal specifications. A suitably designed elevator system may also be required.

SUMMARY

According to an aspect of the present invention, a method for determining information relating to elevator components received in an elevator shaft is possible. The elevator components are each provided with a machine-readable marker on which or by means of which component-specific information is stored, which can be read out by means of a marker reading device. A movable elevator element on which the marker reading device is arranged is moved through the elevator shaft and in the process, the component-specific information is read out from the markers. According to the invention, the method further comprises a comparison of the read-out component specific information with nominal specifications. The method also comprises the compiling of a report indicating instances of conformity and/or differences between the read-out component-specific information and the nominal specifications. The comparison and the compiling of a report mentioned are carried out in an automated manner, without a person, for example an inspector, needing to compare actual specifications and nominal specifications and to enter the result of the comparison into the report. It may be necessary to start the comparison and/or the compiling of the report manually.

Possible features and advantages of embodiments of the present invention may be considered, among others and without limiting the invention, to be based on the ideas and findings described below.

Here, the nominal specifications indicate which elevator components, for example within the context of designing an elevator system, should be received in the elevator shaft. A standard may be provided that regulates, for each elevator component to be received, which component-specific information is to be regarded as relevant for said elevator component. Based on a standard of this kind, corresponding nominal specifications can then be met for each elevator component to be received according to the design. The component-specific information that is actually relevant for the specific elevator component is then stored in the marker attached to said elevator component. By comparing the actual component-specific information with the nominal specifications, it can be established whether the correct elevator components that were assumed when designing the elevator system have actually been assembled, whether said components have been assembled in the correct manner and in the correct location etc. Instances of conformity and/or differences between the actual information, read out from the relevant marker, relating to the elevator components and optionally to the installation thereof and the nominal specifications can then be collected in a report. The report can in turn be produced in a form that can be read by a human or in machine-readable form.

It is assumed that in the future, the complexity of elevator systems will increase and, correspondingly, increasing numbers of elevator components are to be arranged inside an elevator shaft. For example, safety standards are gradually being increased, and increasing numbers of elevator components in the form of sensors, detectors etc., for example, are needed inside the elevator shaft to comply with these standards. Additionally, elevator systems can increasingly be equipped with convenience functions, which may also make it necessary to install additional elevator components inside an elevator shaft. The consequent plurality of elevator components inside the elevator shaft may make it very complex to inspect said components and/or to log information relating to said elevator components.

Additionally, situations may also arise in which elevator components are attached to regions of the elevator shaft that are difficult to access, for example, such that adhesive labels or stickers attached to the elevator components, on which information relating to the elevator components can be displayed such that it can be read by a human inspector, are impossible or difficult to see.

Additionally, dangerous situations may arise for a human inspector when the elevator components are being inspected or logged, as said inspector must be moved along the entire elevator shaft while standing on the roof of the elevator car, for example.

It is therefore proposed that the process of determining information relating to elevator components received in an elevator shaft be automated.

For this purpose, it is proposed to provide each of the elevator components to be determined with a machine-readable marker. Component-specific information can be stored on or by means of the marker. Component-specific information of this kind may be a serial number of the elevator component, a type of the elevator component, a date of manufacture of the elevator component, certification of the elevator component etc., for example. Component-specific information of this kind may be intrinsic to a relevant elevator component as soon as said component has been completed and may be collected by a manufacturer of the component and stored on the marker in advance, for example.

The component-specific information mentioned particularly specifies properties that are independent of an operating state of the component. Properties of this kind are invariable properties of the component, for example, such as the above-mentioned information relating to the serial number, type, date of manufacture or certification, but also parameters set on the component, such as a release speed of an overspeed monitoring device. The component-specific information may also be particularly suitable for unambiguously identifying the elevator components attached in the elevator shaft on the basis of the serial numbers thereof. Specifying properties that are independent of the operating state of the component can also be advantageously carried out without the comparison of the read-out component-specific information with nominal specifications and the compiling of a report indicating instances of conformity and/or differences between the read-out component-specific information and the nominal specifications.

Storing component-specific information using a marker is to be understood to mean in this case that the information is represented by a structure and/or a position of the marker. For example, a marker may be a mark having a specific shape and/or color, specific information being associated with the shape and the color. The marker may also be formed by the shape of the elevator component itself, so that the component-specific information is represented by an alignment or orientation of the elevator component. For example, a hexagonal screw head of a screw may form a marker.

If the information mentioned is represented by the position of a marker, the position may result during installation of the components, for example. The marker may be designed as a mark on a screw head of a screw, for example, and therefore the position of the mark indicates an angular position of the screw. A change in the position of the mark may indicate a change in the angular position of the screw, for example, i.e. that the screw has loosened slightly, for example. If, as described above, a hexagonal screw head of the screw forms the marker, the orientation of the screw head indicates the angular position of the screw. A change in the above-mentioned orientation of the screw head can also indicate that the screw has loosened slightly. In the case of a hexagonal screw head, detection would only be impossible if the orientation has changed by exactly 60° or a multiple thereof. However, this situation is very unlikely.

It is possible that not all the screws used are provided with a mark or are regarded as markers, but rather only the screws of which the condition must be logged and checked if necessary.

The markers should be machine-readable in this case. In other words, the component-specific information should be stored in the marker and able to be read out in such a way that said information can be read out by a machine, such as a specific reading device, easily and unambiguously and can be further processed if necessary. For example, the information may be stored in a digital form. Storing the information and the ability of the information to be read out by a machine can be based on various physical principles. For example, the information may be stored and/or read out electrically, magnetically, optically, mechanically or in another manner. Specific embodiments are explained in more detail below.

In order to be able to collect, within the context of an inspection process or logging process, the information relating to all the elevator components specifically assembled in an elevator shaft, a marker reading device is attached to the elevator element that can move in the elevator shaft, for example to the elevator cab. The marker reading device may be specifically adapted to the markers attached to the elevator components and may be designed to read out the component-specific information stored therein. According to the type of marker used, the marker reading device may also be designed based on different physical principles.

In principle, the marker reading device can be attached to the movable elevator element in any desired manner as long as it is possible to move the marker reading device, together with the corresponding elevator element, inside the elevator shaft as a result. For example, the marker reading device may be attached to a roof and/or a floor of the elevator car. Preferably, the marker reading device is only temporarily attached to the movable elevator element, i.e. only for the period in which the inspection process or the logging process is carried out.

The movable elevator element and the marker reading device are then moved through the elevator shaft and, in the process, the component-specific information is read out in an automated manner from each of the markers attached to the different elevator components. Automated reading out is understood to mean that the information can be read out preferably without requiring human interaction. In other words, after the marker reading device has been attached to the movable elevator element, the information is automatically read out within the context of an automated process and then logged and/or verified, for example.

If the markers are designed as marks on screw heads, or the screw or the screw head thereof is regarded as a marker, moving a marker reading device and reading the component-specific information out as described may also be used to check the condition of the relevant screw. For example, the position of the mark or the screw head of a screw can be detected using a camera and can be compared with a stored position, for example after initial assembly or checking for a final time. If the position mentioned has not changed or a deviation from the stored position is no greater than a limit value, it may be assumed that the screw has not loosened and it is not necessary to retighten the screw. However, if the deviation mentioned is too great, this can cause the screw to be checked. In this case, the camera mentioned may be attached temporarily or permanently to the movable elevator element.

If moving a marker reading device and reading the component-specific information out as described is not carried out during initial manufacture of an elevator system, but instead later, for example during upcoming maintenance, comparing the serial numbers in the last report and in the current report can establish whether elevator components have been replaced. It can also be established whether the installed elevator components can or may be used for the present elevator system at all. For this purpose, the markers may also contain additional information such as information relating to the manufacturer of the components or the like. In order to prevent falsification, the information may also be stored on the marker in encrypted form.

According to one embodiment, the markers can be read out in a contactless manner. The ability to be read out in a contactless manner can be advantageous in that the marker reading device does not need to be brought into direct mechanical contact with each of the markers in order to read out the component-specific information therefrom. Instead, it may be sufficient to simply bring the marker reading device into the vicinity of a marker in order to be able to read out the information thereon in a contactless manner. For example, it may be sufficient to simply bring the marker reading device to within a minimum of 0.1 m, preferably only within a minimum of 1 m or a minimum of 2 m, of one of the markers to be read out. Elevator components that are installed on regions of the elevator shaft that are difficult to access, for example, can also be inspected and/or logged using markers that can be read out in a contactless manner.

According to one embodiment, the markers can be read out electromagnetically. Markers that can be read out electromagnetically can be read out in a contactless manner, for example by the electromagnetic radiation that encodes the information stored in said markers being transmitted from the marker to the marker reading device and as a result, the corresponding information can be read out by the marker reading device in an automated manner.

According to a specific embodiment, the markers may be RFID tags. RFID (radio-frequency identification) refers to a technology for sender-receiver systems for identifying, locating, etc. objects automatically and in a contactless manner, using radio waves. An RFID system usually consists of an RFID tag, sometimes also referred to as a transponder, which is located on or in the object in question and on which desired information can be stored in codified form, and of a reading device, using which said information can be read out. By now, it is possible to provide RFID tags cost-effectively and so as to be very small.

In the system described here, RFID tags can be attached to each elevator component to be determined. For example, an RFID tag may be stuck onto the elevator component in the form of an adhesive label. The component-specific information relating to this elevator component can be stored in the RFID tag. Furthermore, additional information may be also stored on the RFID tag if necessary.

Reading an RFID tag out in a contactless manner does not usually require a direct "line of sight" between the RFID tag and the marker reading device, as the radio waves used for transmitting data can pass through many optically opaque materials. As a result, it is also possible to easily read out markers that are attached to regions of the elevator shaft that are difficult to access or difficult to inspect optically. Additionally, reading the RFID tags out is usually relatively insensitive to surface contamination of the RFID tag.

According to a further specific embodiment, the markers may be UHF RFID tags. While conventional RFID tags are usually designed for operation in a long-wave frequency range of between 100 kHz and 1 MHz, for example, or a short-wave frequency of up to 20 MHz, for example, UHF RFID tags are designed for operation in a much more high-frequency frequency range of more than 100 MHz, for example approximately 900 MHz.

It is assumed that UHF RFID tags of this kind can provide a better option for transmitting data than low-frequency RFID tags, in particular in the environmental conditions found in an elevator shaft. In particular, it is assumed that in the elevator shaft, the plurality of metal components typically installed in said shaft may make it more difficult to electromagnetically transmit data between an RFID tag that functions as a marker and a corresponding reading device, and that UHF RFID tags may react less sensitively to disturbances from adjacent metal component parts due to said tags transmitting data at a higher frequency.

According to an alternative or additional embodiment, it may be possible to read out the markers optically. For example, information may be shown on markers of this kind in a visually recognizable optical spectral region (from approximately 400 to 800 nm), or alternatively in a UV or IR spectral region. Markers of this kind that can be read out optically may be read out using a camera specifically adapted for this purpose, for example.

In a specific embodiment, the markers may be barcodes or QR codes, for example. The markers may also be designed as marks formed of screw heads, for example, as described above.

A barcode is a series of usually mutually parallel lines and spaces of various widths, which lines and spaces represent data in the form of binary symbols in such a way that this data can be read out optoelectronically. The information stored in a barcode of this kind can be read out by a machine and electronically processed using an optical reading device such as a scanner or a camera.

Like a barcode, a QR (Quick Response) code also depicts information stored therein in such a way that said information can be read out optically. However, in the case of a QR code, the information is stored as a two-dimensional pattern, whereas a barcode is formed of a one-dimensional series of lines.

Both barcodes and QR codes can be read out in a contactless manner and are therefore highly suitable for storing and depicting component-specific information relating to elevator components within the context of the method described herein. However, in order to read out markers in the form of barcodes or QR codes, it must usually be possible to establish a direct visual connection between the marker and the marker reading device, and therefore it may be difficult to read out information stored thereon, in particular if an elevator component is installed in a region of the elevator shaft that is difficult to access. Contamination on the barcode or QR code can also make it more difficult to optically read out the information stored therein.

According to one embodiment, the markers, in particular the above-mentioned RFID tags, may be passive component parts. In this context, a passive component part is understood to mean a component part that is not provided with a separate energy supply. A passive component part does not need to be connected to a power source, for example. Using passive markers can prevent each marker needing to be supplied with a separate energy source and being connected to an electrical power source by cables, for example, for this purpose.

In principle, RFID tags can be provided both as passive and as active component parts. An active RFID tag transmits active radio waves in which desired information is encoded. The active RFID tag requires an energy source for this purpose. A passive RFID tag is generally based on reflecting or sending back radiated radio waves in an encoding manner and does not require a separate energy source for this purpose. Radio waves that are radiated by the reading device, for example, are first absorbed at least in part in the RFID tag and then reflected back or sent back to the reading device in an encoding manner.

According to one embodiment, additional installation-specific information can be stored on the marker when an elevator component is installed. While the movable elevator component and the marker reading device attached thereto are being moved, the installation-specific information can then also be read out from each of the markers. Storing installation-specific information on the marker and later reading out said information in this way can also be carried out advantageously without the comparison of read-out component-specific information with nominal specifications and the compiling of a report indicating instances of conformity and/or differences between the read-out component-specific information and the nominal specifications.

Installation-specific information can be understood to mean information that is usually not yet known before installing the elevator component in the elevator shaft, i.e. directly after manufacturing the elevator component, for example, but instead only becomes known during installation or after installation. The term "installation-specific" is to be interpreted in a broad sense and should, for example, also include information that only becomes known during maintenance work on the elevator system and/or the elevator components thereof.

For example, a way in which an elevator component is assembled in the elevator shaft and/or a location at which an elevator component is assembled in the elevator shaft and/or an orientation with which an elevator component is installed inside the elevator shaft may be regarded as installation-specific information of this kind. A time of assembly and/or an identification of the person carrying out assembly may also be accepted as installation-specific information. A position or location in the elevator shaft, for example, of parts of an elevator system that form elevator components can therefore be encoded using installation-specific information and stored in the machine-readable marker.

For example, screws, screw anchors, bolts etc. can each be equipped with a marker, for example an RFID tag. A fitter assembling these elevator components can then store corresponding installation-specific information on this marker after installation. For example, a location or position of a screw can be stored. A tool used for installing the screw and/or a torque for tightening the screw and/or a plurality of rotations and/or a pretension of the screw may also be stored. The fitter may use a suitable marker writing device for this purpose, for example, in order to be able to store the additional installation-specific information on a marker that is already located on the installed component, for example. For example, a tool, in particular a screwdriver, using which the elevator component is installed, may be provided with a marker writing device that stores the above-mentioned information on the marker after the elevator component in question has been completely installed. Alternatively, the fitter can create an additional marker on which the installation-specific information is stored and attach said marker to the elevator component.

It is also possible that settings have to be implemented on elevator components, which are implemented either before assembly or during assembly. Settings of this kind may be a braking torque in the case of a safety brake or a maximum permitted speed in the case of speed monitoring. These settings may also be stored on the marker and later read out.

According to one embodiment, the proposed method further comprises the compiling of a report indicating the read-out component-specific information and optionally the installation-specific information for all the marked elevator components. In other words, the information relating to the elevator components received in the elevator shaft that is read out within the context of the method can be compiled in the form of a report.

A report of this kind can be compiled in a form that can be read by a human. For example, the report can be printed out as a list. In a list of this kind, all the elevator components received in the elevator shaft can, for example, be listed together with the component-specific information relating thereto.

Alternatively, the report may be created in a machine-readable manner, for example as an electronic report. A machine-readable report of this kind can easily be transferred to analysis devices, for example, or stored electronically, for example.

According to a further embodiment, the method can further comprise a comparison of the read-out installation-specific information with nominal specifications. In this case, the method may additionally comprise the compiling of a report indicating, for example, instances of conformity and/or differences between the read-out installation-specific information and the nominal specifications. The instances of conformity and/or differences with regard to the installation-specific information may be contained in the report with regard to the component-specific information or a separate report with regard to the installation-specific information may be created.

According to a further embodiment, when the proposed method is carried out, location information relating to a distance of the marker from the marker reading device and/or a position of the marker relative to the marker reading device can also be derived from a signal strength of a signal generated by one of the markers.

In particular, if RFID tags are used as markers, it is conceivable that, when detected by the marker reading device, a radio wave signal generated or reflected back by an RFID tag has a noticeably higher signal strength when the marker is close to the marker reading device than when the marker is positioned remotely from the marker reading device. By evaluating a signal strength of this kind, a distance of the marker from the reading device can therefore be deduced and, if necessary, a position of the marker relative to the reading device can even be derived. It is thus possible to determine positions of markers and thereby also positions of elevator components inside the elevator shaft when the method described herein is being carried out and to log said positions or depict them in a report as additional information, for example, and/or store said positions on the marker.

Alternatively or additionally, when the proposed method is being carried out, location information relating to a position of the marker in the elevator shaft can also be derived by a coupling connection to a position measuring unit. This location information can also be depicted in the report and/or stored on the marker. The position measuring unit mentioned is required in particular for operating the elevator system. Said coupling connection to a position measuring unit can also be used advantageously without the comparison of read-out component-specific information with nominal specifications and the compiling of a report indicating instances of conformity and/or differences between the read-out component-specific information and the nominal specifications.

The position measuring unit may be provided, for example, with sensors that are distributed in the elevator shaft and can interact with corresponding counter pieces, for example on the elevator car. An exact position of the elevator car, and thereby an exact position of a marker reading device arranged on the elevator car, inside the elevator shaft can thus be determined. The position of the read-out marker can be inferred based on this information. In addition to the position measuring unit mentioned, additional absolute or relative position measuring units that are known to a person skilled in the art may be used.

According to one embodiment, the method proposed herein can be carried out preferably within the context of a final acceptance test of an elevator system. A final acceptance test of this kind typically takes place after an elevator system has been completely installed and checked and before the elevator system is able to begin normal operation. At a stage of this kind, the method described herein makes it possible to use the elevator components that are already installed and the markers attached thereto and, in particular an elevator car that is already assembled, as a movable elevator element, in order to be able to create, in a simple and reliable manner, a report comprising information relating to the elevator components received in the elevator shaft, by temporarily attaching a marker reading device to said movable elevator element and then moving the movable elevator element through the entire elevator shaft.

The proposed method can also be carried out after one or more elevator components have been repaired and/or replaced.

It is also possible that installation-specific information relating to all the elevator components or individual components or the created report is stored on an additional marker and attached in the elevator shaft.

It should be noted that some of the possible features and advantages of the invention are described herein with reference to different embodiments. A person skilled in the art recognizes that the features can be combined, adapted or replaced as appropriate in order to arrive at further embodiments of the invention.

Embodiments of the invention will be described below with reference to the accompanying drawings, neither the drawings nor the description being intended to be interpreted as limiting the invention.

DETAILED DESCRIPTION

Figure 1:
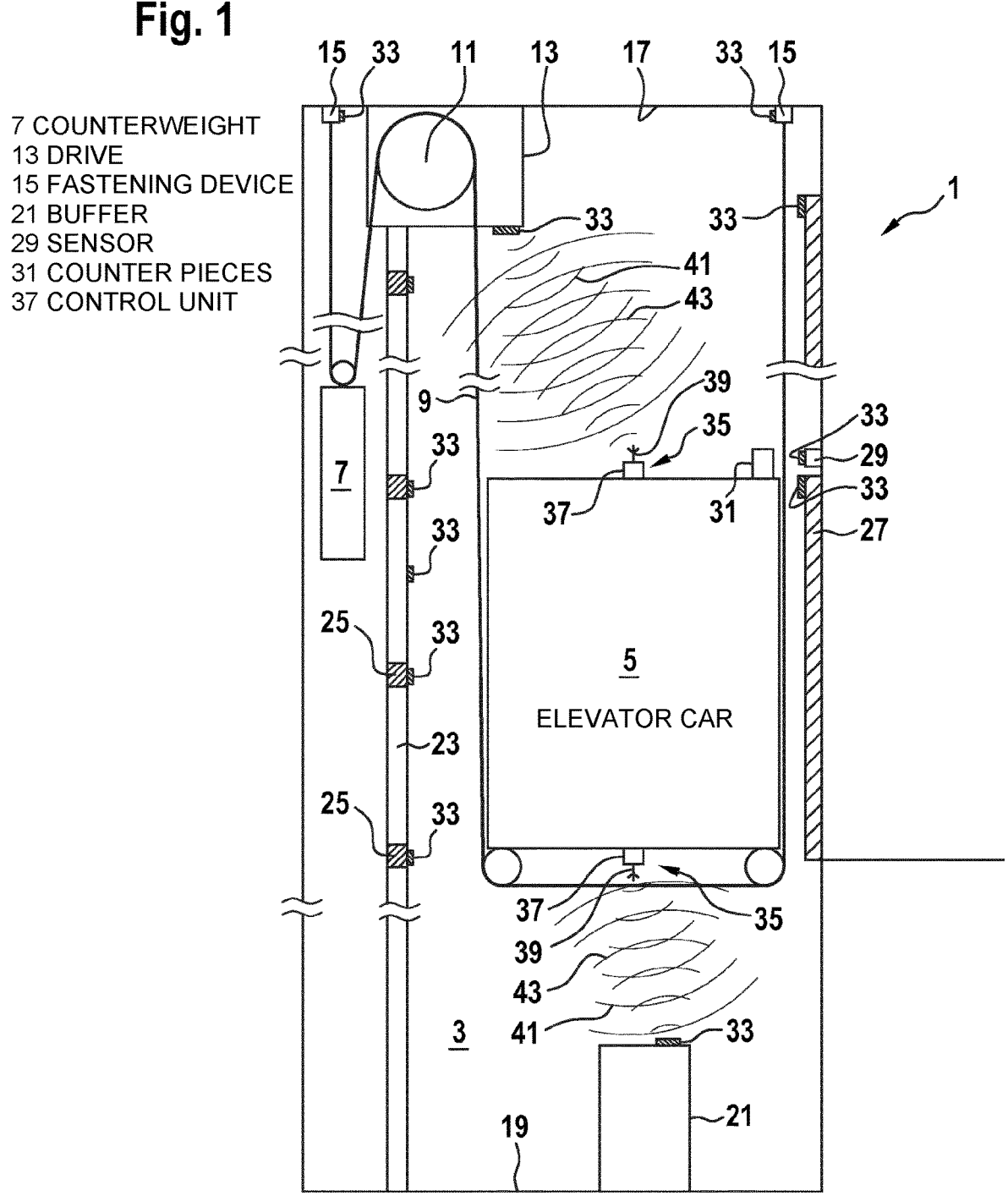
FIG. 1 shows an elevator system that is suitable for applying a method according to the invention. The drawing is merely schematic and is not to scale.

FIG. 1 shows an elevator system 1, in which two movable elevator elements 5, 7, in the form of an elevator car 5 and a counterweight 7, can be moved in an elevator shaft 3. The elevator car 5 and the counterweight 7 are held by a suspension means 9 in the form of one or more belts or cables. The suspension means 9 may be displaced by means of a drive sheave 11 of a drive 13 provided with a motor, in order to move the elevator car 5 and counterweight 7 hung on said suspension means in opposite directions within the elevator shaft 3. The ends of the suspension means 9 are each fastened by fastening devices 15 to a ceiling 17 of the elevator shaft 3.

A plurality of additional elevator components are received in the elevator shaft 3 in addition to the above-mentioned movable elevator elements and permanently installed elevator components. For example, a buffer 21 is provided on a floor 19 of the elevator shaft 3. Guide rails 23 may be fastened to the walls of the elevator shaft 3 using fixing clamps 25 ("brackets"). The guide rails 23 may be used, for example, to guide the elevator car 5 or the counterweight 7 in a vertical movement. Shaft doors 27 can be provided so as to adjoin floors, which doors allow access to an elevator car 5 that has stopped in a floor. Furthermore, sensors 29 or other parts of a sensor system may be provided in the elevator shaft 3, which sensors or parts can interact with corresponding counter pieces 31, for example on the elevator car 5, in order to be able to determine an exact position of the elevator car 5 inside the elevator shaft 3, for example. The sensors 29 and the counter piece 31 form a position measuring unit for the position of the elevator car 5. In addition to the elevator components mentioned by way of example, additional elevator components may be arranged in the elevator shaft 3.

In general, the elevator components of an elevator system 1 are specifically selected at the design stage of said elevator system in order to meet the requirements and/or regulations specified for the particular elevator system. For this purpose, each elevator component is precisely specified with regard to the type and mode of operation thereof, for example, and a particular embodiment of an elevator component such as a fixing clamp 25 is selected for the specific use, for example.

When the elevator system 1 is being installed, however, circumstances may arise that make it necessary to not actually install the exact elevator components that were planned in the design phase. After the elevator system 1 has been completed, a report is usually created, using the elevator components actually assembled in the elevator shaft 3, as part of a final acceptance test.

In order to simplify creating a report of this kind, a suitable marker 33 that can be read out by a machine is attached to each relevant elevator component. The marker 33 contains component-specific information stored thereon such as the type, model, year of manufacture, serial number, specification etc. of the relevant elevator component.

For example, within the context of the final acceptance test, a marker reading device 35 can then be attached to one of the movable elevator elements 5, 7, for example to the car 5. The marker reading device 35 is designed to read out the component-specific information stored in the markers 33, preferably in a contactless manner.

In the example shown, a marker reading device 35 is arranged on both the upper side and the lower side of the elevator car 5. As a result, markers both above the elevator car 5 and below the elevator car 5 can be read out easily and with high accuracy. The marker reading device 35 may be arranged so as to be detachable and can be merely temporarily attached to the movable elevator element 5, 7 while the desired report is being created.

In the example shown, RFID tags, in particular of a specific UHF RFID tag type, are used as markers 33. A marker reading device 35 comprises a control unit 37 and one or more antennae 39. The control unit 37 can control the antennae 39 such that radio waves 41, in particular high-frequency radio waves having a frequency in the region of several hundred MHz, are emitted. If said radio waves 41 encounter an RFID tag functioning as a marker 33, an information-bearing wave 43 is reflected back, in which wave the information stored in the RFID tag is encoded. The wave 43 that is reflected back can then be received in turn by a receiver, which is preferably part of the marker reading device 35, and then evaluated.

In order to create the desired report, the elevator car 5 may be moved vertically through the elevator shaft 3 from the lower end to the upper end and/or vice versa, for example, after the marker reading device 35 or the two marker reading devices 35 have been attached to said car. In the process, the marker reading devices 35 successively pass all the elevator components and the markers 33 attached thereto and are able to read out the component-specific information relating thereto. In order to ensure high accuracy when reading out, it may be advantageous to move the movable elevator elements 5, 7 more slowly during the logging process than in normal operation of the elevator system 1. The desired report can be created from the read-out information.

Figure 2:
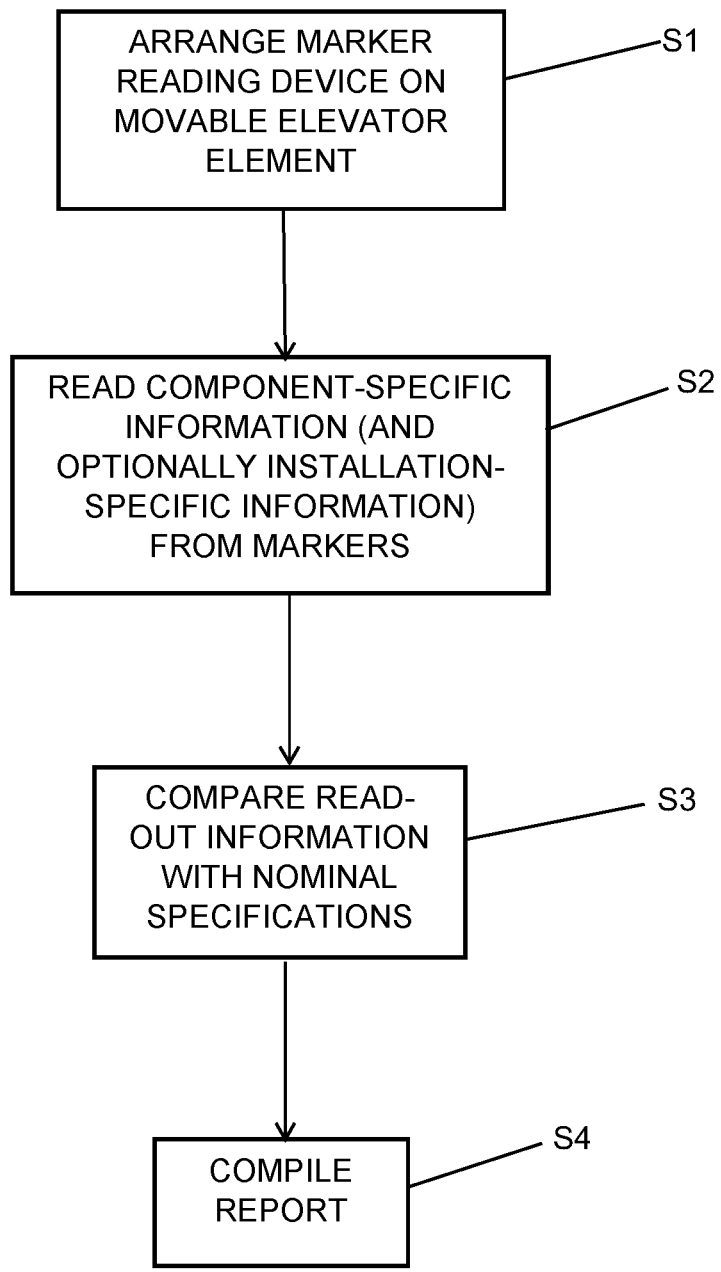
FIG. 2 shows a flow diagram of the comparison and compilation steps of the method according to the invention.

In particular, the read-out information may be compared with nominal specifications in order to be able to create a report in which instances of conformity and/or differences between the elevator components actually installed in the elevator shaft 3 and nominal elevator components that are specified within the context of the design phase, for example, are indicated. FIG. 2 is a flow diagram of the inventive method that includes the steps of: S1 arranging a marker reading device on a movable elevator element; S2 reading the component-specific information from the markers with the marker reading device; S3 performing an automated comparison of the read-out component-specific information with nominal specifications indicating which elevator components are to be received in the elevator shaft; and S4 performing automated compiling of reports indicating instances of at least one of conformity and differences between the read-out component-specific information and the nominal specifications and/or the read-out component-specific information for all elevator components provided with the markers.

Optionally, installation-specific information may also be stored in the markers 33 in addition to the component-specific information. Installation-specific information of this kind may depict, for example, a location or a position in the elevator shaft 3 at which an elevator component has been installed, a time at which it has been installed, and/or a way in which the elevator component has been installed. Installation-specific information of this kind can be detected and stored on a relevant marker 33 when the elevator system is initially installed. Alternatively, during later operation, i.e. after the final acceptance test of the elevator system, for example within the context of maintenance work, individual elevator components and the manner of their installation may be modified and information relating thereto may be stored in the relevant marker 33 as installation-specific information. The installation-specific information can be processed according to the steps S2, S3 and S4 of FIG. 2.

The position of a marker 33 in the elevator shaft may be derived by a coupling connection to the position measuring unit formed of the sensors 29 and the counter piece 31. The position of the elevator car 5 and thereby of the marker reading device 35 in the elevator shaft 3 can be determined by means of the position measuring device. The position of a marker 33 in the elevator shaft 3 can be deduced from the position of the marker reading device 35. For this purpose, the signal strength of the radio wave signal can be evaluated, for example, when it is detected by the marker reading device 35.

Additionally, installation-specific information relating to all the elevator components or individual components or the created report can be stored on an additional marker and attached in the elevator shaft.

The markers 33 may be designed as marks on screw heads, barcodes, or QR codes. In this case, the marker reading device 35 is designed as a camera that scans the marks, barcodes or QR codes optically, so that the information can be read out.

Finally, it should be noted that terms such as "comprising", "having" etc. do not preclude other elements or steps and terms such as "a/an" or "one" do not preclude a plurality. Furthermore, it should be noted that features or steps that have been described with reference to one of the embodiments above may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for determining information relating to elevator components received in an elevator shaft, the elevator components each being provided with a machine-readable marker on which or by which component-specific information is stored, which component-specific information can be read out by a marker reading device, comprising the steps of:
arranging a marker reading device on a movable elevator element;
moving the movable elevator component through the elevator shaft while reading out the component-specific information from the markers with the marker reading device;
performing an automated comparison of the read-out component-specific information with nominal specifications indicating which elevator components are to be received in the elevator shaft; and
performing an automated compiling of a report indicating instances of at least one of conformity and differences between the read-out component-specific information and the nominal specifications.

2. The method according to claim 1 wherein the markers are read out in a contactless manner.

3. The method according to claim 1 wherein the markers are read out electromagnetically.

4. The method according to claim 1 wherein the markers are RFID tags.

5. The method according to claim 4 wherein the markers are UHF RFID tags.

6. The method according to claim 1 wherein the markers are read out optically.

7. The method according to claim 6 wherein the markers are at least one of marks, barcodes and QR codes.

8. The method according to claim 1 wherein the markers are passive component parts.

9. The method according to claim 1 including storing additional installation-specific information on at least one of the markers when an associated one of the elevator components is installed, and reading out the installation-specific information from the at least one marker while the movable elevator element, together with the marker reading device, is being moved.

10. The method according to claim 9 including automated compiling of a report indicating the read-out component-specific information and optionally the installation-specific information for all the elevator components provided with the markers.

11. The method according to claim 9 including comparing the read-out installation-specific information with the nominal specifications, and automated compiling of a report indicating instances of at least one of conformity and differences between the read-out installation-specific information and the nominal specifications.

12. The method according to claim 1 including deriving at least one of location information relating to a distance of one of the markers from the marker reading device and a position of the one marker relative to the marker reading device from a signal strength of a signal generated by the one marker.

13. The method according to claim 1 including deriving location information relating to a position of one of the markers in the elevator shaft by a coupling connection to a position measuring unit.

14. The method according to claim 1 including performing the steps in association with a final acceptance test of an elevator system.

15. An elevator system comprising:
an elevator shaft;
a movable elevator element in the elevator shaft;
a plurality of elevator components received in the elevator shaft, a machine-readable marker being attached to each of the elevator components, on which marker a component-specific information for the associated elevator component is stored;
a marker reading device attached to the movable elevator element; and
wherein when the movable elevator component is moved through the elevator shaft the component-specific information is read out from the markers with the marker reading device, an automated comparison of the read-out component-specific information with nominal specifications indicating which elevator components are to be received in the elevator shaft is performed, and an automated compiling of a report indicating instances of at least one of conformity and differences between the read-out component-specific information and the nominal specifications is performed.

* * * * *